United States Patent
Chen et al.

(10) Patent No.: US 9,718,300 B2
(45) Date of Patent: Aug. 1, 2017

(54) LASER WATER TRANSFER PRINTING FILM AND MAKING METHOD THEREOF

(71) Applicants: Tien-Shui Chen, Tainan (TW); Chi-Liang Chen, Tainan (TW); Hua-Hui Chen, Tainan (TW)

(72) Inventors: Tien-Shui Chen, Tainan (TW); Chi-Liang Chen, Tainan (TW); Hua-Hui Chen, Tainan (TW)

(73) Assignees: Yihao Nanometer Technology Co., Ltd., Tainan (TW); Tien-Shui Chen, Tainan (TW); Chi-Liang Chen, Tainan (TW)

(*) Notice: Subject to any disclaimer, the term of this patent is extended or adjusted under 35 U.S.C. 154(b) by 950 days.

(21) Appl. No.: 14/043,951

(22) Filed: Oct. 2, 2013

(65) Prior Publication Data
US 2015/0090582 A1 Apr. 2, 2015

(51) Int. Cl.
*B44C 1/175* (2006.01)
*G03H 1/02* (2006.01)
*G03H 1/18* (2006.01)

(52) U.S. Cl.
CPC .......... *B44C 1/175* (2013.01); *G03H 1/0248* (2013.01); *G03H 1/18* (2013.01)

(58) Field of Classification Search
CPC .......... G03H 1/18; G03H 1/0248; B44C 1/175
See application file for complete search history.

(56) References Cited

U.S. PATENT DOCUMENTS

| 2,084,849 | A * | 6/1937 | Lasker, Jr. | C09D 11/52 427/122 |
|---|---|---|---|---|
| 2010/0000668 | A1* | 1/2010 | Wu | B44C 1/175 156/230 |
| 2010/0181380 | A1* | 7/2010 | Trotter | G06K 19/077 235/488 |

* cited by examiner

*Primary Examiner* — Mathieu Vargot
(74) *Attorney, Agent, or Firm* — Alan D. Kamrath; Kamrath IP Lawfirm, P.A.

(57) ABSTRACT

A method of making a laser water transfer printing film contains steps of: providing a substrate material; coating a release layer on one side surface of the PET film by ways of a first coating apparatus; semi-solidifying a gold reservoir by using a heat solidifying apparatus; printing an ink layer on the gold reservoir by ways of a printing device; implanting a message layer on the ink layer by ways of an implanting device; embossing geometric patterns on the message layer by using a rolling device; plating the metal layer on the embossed patterns; coating a PVA solution on the metal layer by ways of a second coating device and drying the PVA solution by means of a drying device; separating the PET film from the PVA film by using a releasing device; and then rolling the PET film which has separated from the PVA film.

5 Claims, 3 Drawing Sheets

LASER WATER TRANSFER PRINTING FILM AND MAKING METHOD THEREOF

FIELD OF THE INVENTION

The present invent relates to a method of making a laser water transfer printing film which includes a release layer for facilitating a separation of a PET film from a PVA film easily so as to use the PET film repeatedly.

BACKGROUND OF THE INVENTION

Convention method of making water transfer printing film contains steps of: coating an adhesive agent on a PET (polyethylene terephthalate) film, drying the adhesive agent, rolling a PVA (polyvinyl alcohol) film to the PET film, adhering and heating the PET film and the PVA film so that an ink layer on the PET film is printed on the PVA film. However, the ink layer is damaged easily when being printed to the PVA film. In addition, the ink layer has a lacquer coated thereon, but dusts attach on the lacquer easily. Furthermore, after printing the PET film on the PVA film, the PET film is discarded or burned, thus wasting the PET film.

The present invention has arisen to mitigate and/or obviate the afore-described disadvantages.

SUMMARY OF THE INVENTION

The primary object of the present invention is to provide a method of making a laser water transfer printing film which includes a release layer for facilitating a separation of a PET film from a PVA film easily so as to use the PET film repeatedly.

Further object of the present invention is to provide a method of making a laser water transfer printing film which obtains a thickness of the PVA film within 20 to 50 micron so as to vary metal lusters.

Another object of the present invention is to provide a method of making a laser water transfer printing film which coats a gold reservoir on the release layer to prevent an ink layer from damage in a transfer printing process.

To obtain the above objective, a method of making a laser water transfer printing film provided by the present invention contains steps of:

providing a substrate material, wherein the substrate material is a PET film rolled;

coating a release layer on one side surface of the PET film by ways of a first coating apparatus, wherein the release layer has a gold reservoir coated thereon;

semi-solidifying the gold reservoir by using a heat solidifying apparatus;

printing an ink layer on the gold reservoir by ways of a printing device;

implanting a message layer on the ink layer by means of an implanting device;

embossing geometric patterns on the message layer by using a rolling device so as to form embossed patterns on the message layer;

plating the metal layer on the embossed patterns;

coating a PVA solution on the metal layer by ways of a second coating device and drying the PVA solution by means of a drying device so as to form a PVA film on the metal layer;

separating the PET film from the PVA film by using a releasing device and then rolling the PET film which has separated from the PVA film.

Preferably, the message layer is made of any one of graphite and electricity conductive material so as to conduct electricity to the metal layer.

Preferably, the metal layer is plated on the embossed patterns in any one of a sputtering manner, a vacuum evaporating manner, and a plating manner.

Preferably, the metal layer has one surface for refracting lights.

Preferably, a thickness of the PVA film is within 20 to 50 micron.

DETAILED DESCRIPTION OF THE PREFERRED EMBODIMENTS

Figure 1:
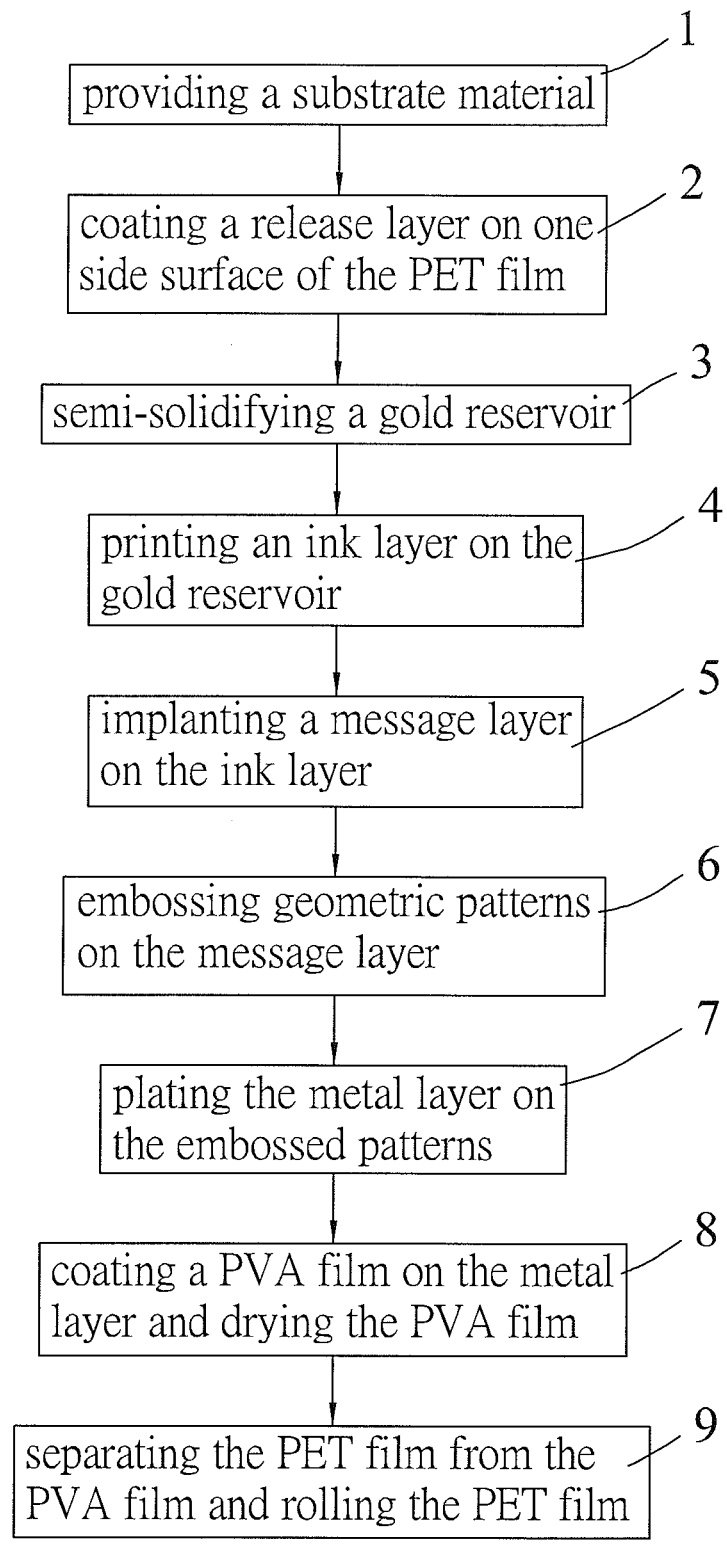
FIG. 1 is a flow chart of a method of making a laser water transfer printing film according to a preferred embodiment of the present invention.
Figure 2:
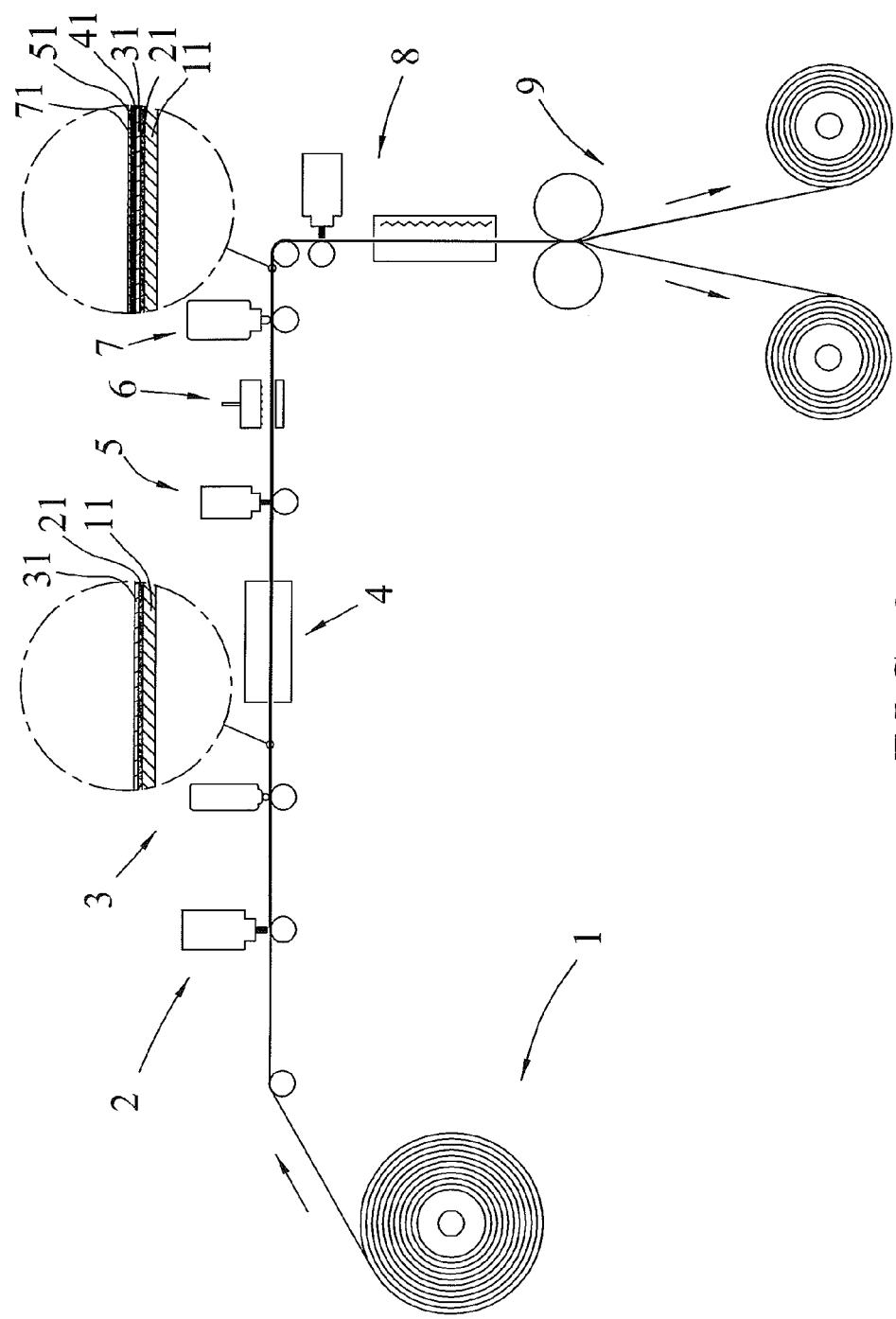
FIG. 2 is a diagram showing the operation of the method of the laser water transfer printing film according to the preferred embodiment of the present invention.
Figure 3:
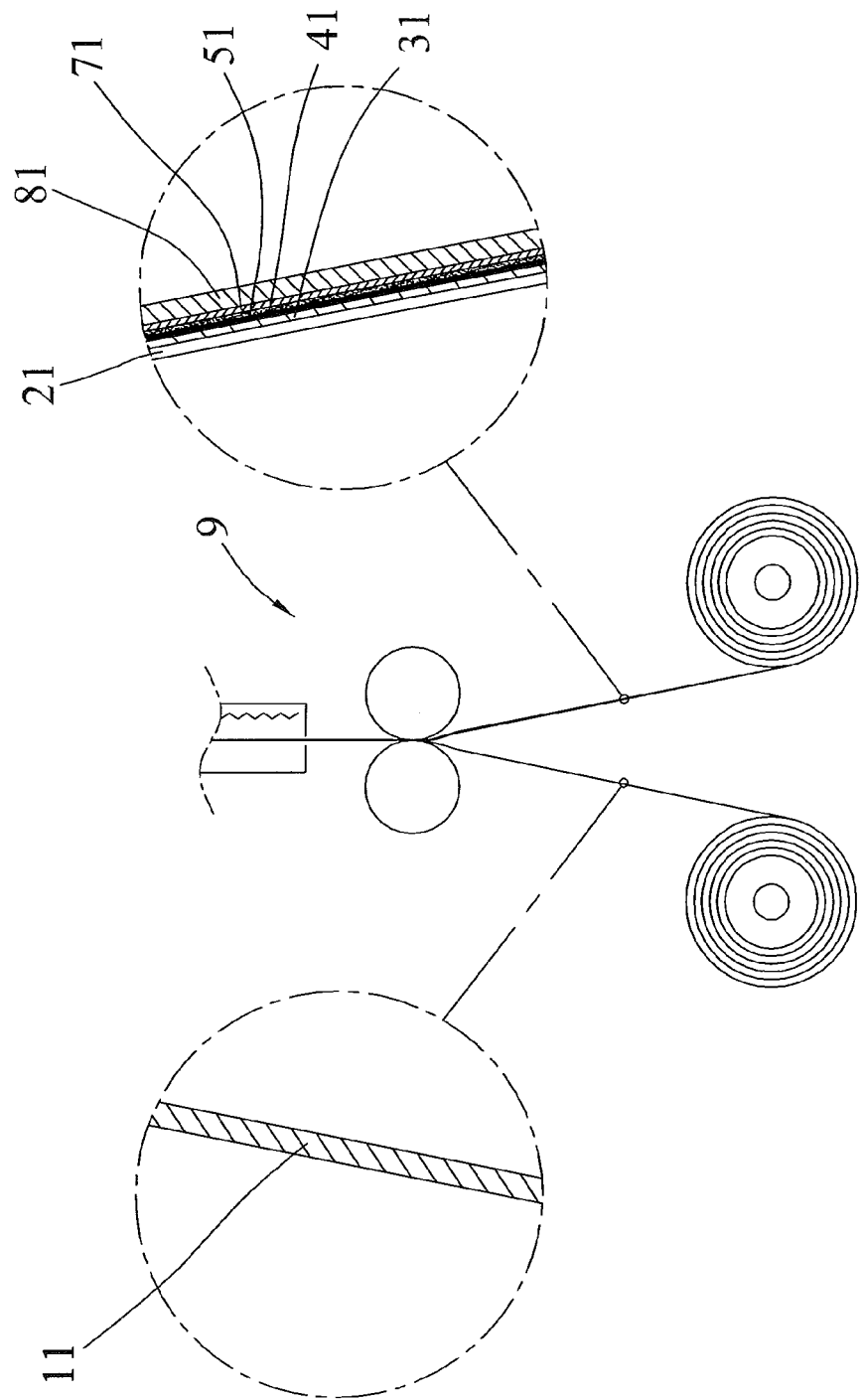
FIG. 3 is another diagram showing the operation of the method of the laser water transfer printing film according to the preferred embodiment of the present invention.

With reference to FIGS. 1-3, a method of making a laser water transfer printing film according to the present invention comprises:

Step (1). providing a substrate material, wherein the substrate material is a PET (polyethylene terephthalate) film 11 rolled;

Step (2). coating a release layer 21 on one side surface of the PET film 11 by ways of a first coating apparatus, wherein the release layer 21 has a gold reservoir 31 coated thereon;

Step (3). semi-solidifying the lacquer 31 by using a heat solidifying apparatus, wherein the gold reservoir 31 is made of heat solidified material and UV light-cured material;

Step (4). printing letters, images or patterns on the gold reservoir 31 by ways of a printing device so as to form an ink layer 41;

Step (5). implanting a message layer 51 on the ink layer 41 by means of an implanting device, wherein the message layer 51 is made of graphite or electricity conductive material so as to conduct electricity to a metal layer 71;

Step (6). embossing geometric patterns on the message layer 51 by using a rolling device so as to form embossed patterns 61 on the message layer 51;

Step (7). plating the metal layer 71 on the embossed patterns 61 in a sputtering manner, a vacuum evaporating manner or a plating manner, wherein the metal layer 71 has one surface for refracting lights;

Step (8). coating a PVA (polyvinyl alcohol) solution on the metal layer 71 by ways of a second coating device and drying the PVA solution by means of a drying device so as to form a PVA (polyvinyl alcohol) film 81 on the metal layer 71, wherein a thickness of the PVA film 81 is within 20 to 50 micron so as to obtain various metal lusters;

Step (9). separating the PET film 11 from the PVA film 81 by using a releasing device and then rolling the PET film 11 which has separated from the PVA film, wherein the release layer 21 between the PET film 11 and the gold reservoir 31 facilitates a separation of the PET film 11 from the PVA film 81 easily, such that the PET film 11 is rolled and used repeatedly, thereby saving production cost. In addition, the laser water transfer printing film is comprised of the PVA film 81, the metal layer 71, the message layer 51, the ink layer 41, the gold reservoir 31, and the release layer 21.

Accordingly, the advantages of the method of making the laser water transfer printing film contain:

The release layer facilitates the separation of the PET film from the PVA film easily, such that the PET film is used repeatedly. The thickness of the PVA film is within 20 to 50 micron so as to obtain various metal lusters. The release layer has the gold reservoir coated thereon to prevent the ink layer from damage in a transfer printing process.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A method of making a laser water transferring film comprising:
    providing a substrate material, wherein the substrate material is a PET film rolled;
    coating a release layer on one side surface of the PET (polyethylene terephthalate) film by ways of a first coating apparatus, wherein the release layer has a gold reservoir coated thereon;
    semi-solidifying the gold reservoir by using a heat solidifying apparatus;
    printing an ink layer on the gold reservoir by ways of a printing device;
    forming a message layer on the ink layer by means of an implanting device;
    embossing geometric patterns on the message layer by using a rolling device so as to form embossed patterns on the message layer;
    plating a metal layer on the embossed patterns;
    coating a PVA film on the metal layer by ways of a second coating device and drying the PVA film by means of a drying device;
    separating the PET film from the PVA film by using a releasing device and then rolling the PET film which has separated from the PVA film.

2. The method of making the laser water transferring film as claimed in claim 1, wherein the message layer is made of any one of graphite and electricity conductive material so as to conduct electricity to the metal layer.

3. The method of making the laser water transferring film as claimed in claim 1, wherein the metal layer is plated on the embossed patterns in any one of a sputtering manner, a vacuum evaporating manner, and a plating manner.

4. The method of making the laser water transferring film as claimed in claim 1, wherein the metal layer has one surface for refracting lights.

5. The method of making the laser water transferring film as claimed in claim 1, wherein a thickness of the PVA film is within 20 to 50 um.

* * * * *